United States Patent

Higashimura et al.

Patent Number: 5,102,966
Date of Patent: Apr. 7, 1992

[54] PROCESS FOR PREPARING STAR COMPOUNDS

[75] Inventors: Toshinobu Higashimura, 35, Iori-cho, Kitashirakawa, Sakyo-ku; Mitsuo Sawamoto, both of Kyoto; Hajime Shohi, Osaka, all of Japan

[73] Assignees: Sekisui Chemical Co., Ltd., Osaka; Toshinobu Higashimura, Kyoto, both of Japan

[21] Appl. No.: 714,531

[22] Filed: Jun. 13, 1991

[30] Foreign Application Priority Data

Jun. 14, 1990 [JP] Japan .................................. 2-156160
Mar. 30, 1991 [JP] Japan .................................. 3-66509

[51] Int. Cl.$^5$ .......................... C08F 2/00; C08F 216/12
[52] U.S. Cl. ..................................... 526/209; 526/332; 526/333
[58] Field of Search .................. 526/209, 332, 333

Primary Examiner—Joseph L. Schofer
Assistant Examiner—Wu C. Cheng
Attorney, Agent, or Firm—Armstrong, Nikaido, Marmelstein, Kubovcik & Murray

[57] ABSTRACT

A process for preparing a three-branched or four-branched star compound comprising polymerizing an olefine compound represetned by the formula $$CHR^3=CH \atop \underset{A-OR^4}{|} \qquad (II)$$

wherein A is a signle bond or phenylene group, and $R^3$ is a hydrogen atom or methyl group and $R^4$ is a monovalent organic group when A is a signle bond, or $R^3$ is a hydrogen atom and $R^4$ is an alkyl group when A is a phenylene group, using the adduct of a polyfunctional alkenyl ether represetned by the formula (I)

$$R^2(-O-CH=CHR^1)_n \qquad (I)$$

wherein $R^1$ is a hydrogen atom or methyl group, n is an integer of 3 or 4, and $R^2$ is a rtivalent organic group when n is 3 or a tetravelent organic group when n is 4 with a cation-donating compound.

10 Claims, No Drawings

PROCESS FOR PREPARING STAR COMPOUNDS

FIELD OF THE INVENTION

The present invention relates to processes for preparing three-branched or four-branched star compounds such as three-branched star polyalkenyl ethers, four-branched star polyalkenyl ethers, three-branched star polyalkyloxystyrenes and four-branched star polyalkyloxystyrenes.

Such polyfunctional polyolefins are expected to be useful advanced polymer materials as prepolymers for elastomers, crosslinking agents, ionomers, surfactants, compatibilizing agents, etc.

DESCRIPTION OF THE PRIOR ART

Alkenyl ethers and alkyloxystyrenes can be polymerized only by cationic polymerization, whereas usual cationic polymerization involves unstable growing carbocation and encounters difficulties in inhibiting transfer and termination reactions and therefore in forming monodisperse polymers or block copolymers with a reduced distribution of molecular weights.

However, we have found that isobutyl vinyl ether can be subjected to living polymerization to form a polymer or block copolymer having a narrow molecular weight distribution when a binary initiator is used which comprises HI, a cation-donating compound, and $I_2$, $ZnI_2$ or a metal halide ($ZnBr_2$, $ZnCl_2$, $SI_2$, $SCl_2$, $MgCl_2$, $BF_3OEt_2$ or $SnCl_4$. (See Macromolecules, 17, 265 (1984) for $HI/I_2$ initiator, Macromolecules, 20, 2693 (1987) for $HI/ZnI_2$, and Macromolecules, 22, 1552 (1989) for metal halides.)

As to alkyloxystyrenes, we have also found that p-methoxystyrene or p-tert-butoxystyrene can be subjected to living polymerization to give a polymer of narrow molecular weight distribution using a binary initiator which comprises HI, a cation-donating compound, and $ZnI_2$ (Polymer Bulletin, 1988, 19, 7–11, and Macrool. Chem., Suppl., 1989, 15, 127136).

Three- or four-branched star polymers are advanced polymers which have three or four branched chains extending radially from a common center and three or four active ends. Accordingly, they possess such physical properties that are not available with conventional linear high polymers, can be used for wider application, for example, as prepolymers for elastomers, crosslinking agents, ionomers, surfactants, compatibilizing agents, etc. and are expected to be useful advanced polymer materials.

However, the initiator for use in the living cationic polymerization of alkenyl ethers is the adduct of a monofunctional alkenyl ether with a cation-donating compound. Since this adduct forms only one active site per molecule, it has been impossible to prepare star polymers.

SUMMARY OF THE INVENTION

In view of the above situation, the main object of the present invention is to provide a process for preparing a three- or four-branched star compound.

To fulfill this object, the present invention provides a process for preparing a three-branched or four-branched star compound represented by the formula

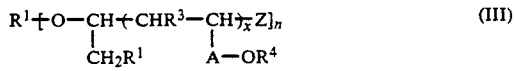

wherein A is a single bond or phenylene group, n is an integer of 3 or 4, $R^1$ is a hydrogen atom or methyl group, $R^2$ is a trivalent organic group when n is 3 or a tetravalent organic group when n is 4, $R^3$ is a hydrogen atom or methyl group when A is a single bond or a hydrogen atom when A is a phenylene group, $R^4$ is a monovalent organic group when A is a single bond or an alkyl group when A is a phenylene group, x is 1 to 10000 and Z is a terminator residue, the process comprising polymerizing an olefin compound represented by the formula

wherein A, $R^3$ and $R^4$ are as defined above, using as an initiator the adduct of a polyfunctional alkenyl ether represented by the formula

wherein $R^1$, $R^2$ and n are as defined above with a cation-donating compound.

The process of the invention will be described first for the preparation of three-branched star compounds.

According to the present process, an alkenyl ether represented by the formula

wherein $R^3$ is a hydrogen atom or methyl group, and $R^4$ is a monovalent organic group is polymerized using as the initiator the adduct of a trifunctional alkenyl ether represented by the formula

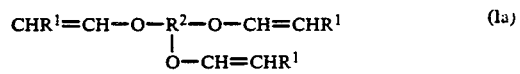

wherein $R^1$ is a hydrogen atom or methyl group, and $R^2$ is a trivalent organic group with a cation-donating compound to prepare a three-branched star alkenyl ether represented by the formula

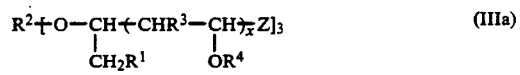

wherein x is 1 to 10,000, Z is a terminator residue, and $R^1$, $R^2$, $R^3$ and $R^4$ are as defined above.

Further according to the present process, an alkyloxystyrene represented by the formula

wherein A is a phenylene group, and $R^4$ is an alkyl group is polymerized using the adduct of a trifunctional alkenyl ether represented by the formula (Ia) with a cation-donating compound as the initiator, and a bivalent metal halide as an activating agent to prepare a corresponding three-branched star alkyloxystyrene represented by the formula $$R^2 + O-CH + CH_2-CH \frac{1}{x} Z]_3 \quad (IIIb)$$
$$\quad\quad\quad |\quad\quad\quad\quad |$$
$$\quad\quad\quad CH_2R^1\quad\quad A-OR^4$$

wherein x is 1 to 10,000, Z is a terminator residue, and $R^1$, $R^2$, $R^4$ and A are as defined above.

Next, the process of the invention will be described for the preparation of four-branched star compounds.

According to the process of the invention, an alkenyl ether represented by the formula.

$$CHR^3=CH \quad (IIa)$$
$$\quad\quad |$$
$$\quad\quad OR^4$$

wherein $R^3$ is a hydrogen atom or methyl group, and $R^4$ is a monovalent organic group is polymerized using as the initiator the adduct of a tetrafunctional alkenyl ether represented by the formula $$CHR^1=CH-O\quad\quad O-CH=CHR^1 \quad (Ib)$$
$$\quad\quad\quad\quad\quad\backslash\quad /$$
$$\quad\quad\quad\quad\quad R^2$$
$$\quad\quad\quad\quad\quad / \quad\backslash$$
$$CHR^1=CH-O\quad\quad O-CH=CHR^1$$

wherein $R^1$ is a hydrogen atom or methyl group, and $R^2$ is a tetravalent organic group with a cation-donating compound to prepare a four-branched star alkenyl ether represented by the formula $$R^2 + O-CH + CHR^3-CH \frac{1}{x} Z]_4 \quad (IIIc)$$
$$\quad\quad\quad |\quad\quad\quad\quad\quad |$$
$$\quad\quad\quad CH_2R^1\quad\quad\quad OR^4$$

wherein x is 1 to 10,000, Z is a terminator residue, and $R^1$, $R^2$, $R^3$ and $R^4$ are as defined above.

Further according to the present process, an alkyloxystyrene represented by the formula $$CH_2=CH \quad (IIb)$$
$$\quad |$$
$$\quad A-OR^4$$

wherein A is a phenylene group, and $R^4$ is an alkyl group is polymerized using the adduct of a tetrafunctional alkenyl ether represented by the formula (Ib) with a cation-donating compound as the initiator, and a bivalent metal halide as an activating agent to prepare a corresponding four-branched star alkyloxystyrene represented by the formula $$R^2 + O-CH + CH_2-CH \frac{1}{x} Z]_4 \quad (IIId)$$
$$\quad\quad\quad |\quad\quad\quad\quad |$$
$$\quad\quad\quad CH_2R^1\quad\quad A-OR^4$$

wherein x is 1 to 10,000, Z is a terminator residue, and $R^1$, $R^2$, $R^4$ and A are as defined above.

DETAILED DESCRIPTION OF THE INVENTION

Given in Tables 1 to 6 are examples of trifunctional alkenyl ethers (Ia) for use in preparing three-branched star compounds.

| trifunctional alkenyl ether | $R^2$ |
|---|---|
| $R^1$; hydrogen atom (—H) | |
| trivinyloxyethyl 1,3,5-benzene-tricarboxylate | 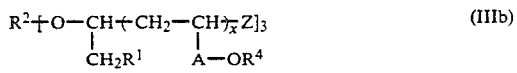 |
| trivinyloxyethyl 1,2,3-benzene-tricarboxylate |  |
| trivenyloxyethyl 1,3,4-benzene-tricarboxylate | 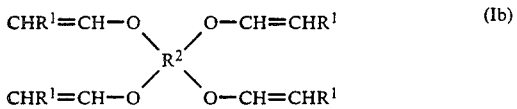 |
| 1,3,5-tri-vinyloxyethyl benzene | 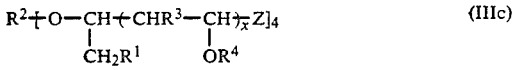 |
| 1,2,3-tri-vinyloxyethoxy benzene | |
| 1,3,4,-tri-vinyloxyethoxy benzene |  |
| 1,1,1-tris(4-vinyloxyethoxy carbonylphenyl) ethane | |
| 1,1,1-tris(4-vinyloxyethoxy phenyl)ethane | |
| 1,1,2-tris(4-vinyloxyethoxy carbonylphenyl) ethane | 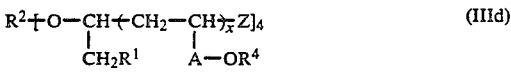 |

| trifunctional alkenyl ether | R² |
|---|---|
| 1,1,2-tris(4-vinyloxyethoxyphenyl)ethane | 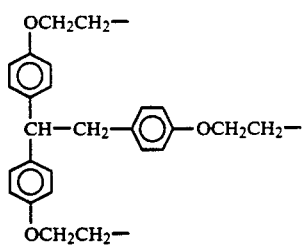 |
| 1,1,1-tris(4-vinyloxyethoxycarbonylmethyl)ethane | 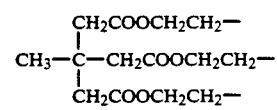 |
| 1,1,1-tris(4-vinyloxyethoxymethyl)ethane | 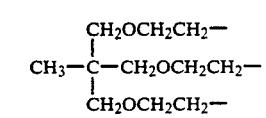 |
| 1,1,2-tris(4-vinyloxyethoxycarbonylmethyl)ethane | 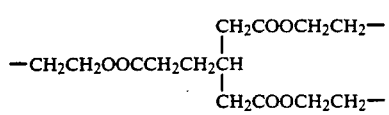 |
| 1,1,2-tris(4-vinyloxyethoxymethyl)ethane | 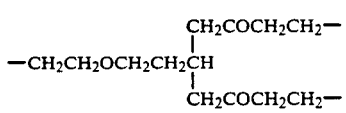 |

R¹; methyl (—CH₃)

| trifunctional alkenyl ether | R² |
|---|---|
| tripropenyloxyethyl 1,3,5-benzenetricarboxylate | 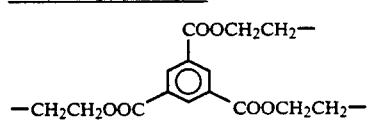 |
| tripropenyloxyethyl 1,2,3-benzenetricarboxylate | 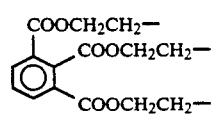 |
| tripropenyloxyethyl 1,3,4-benzenetricarboxylate | 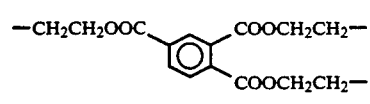 |
| 1,3,5-tripropenyloxyethoxybenzene | 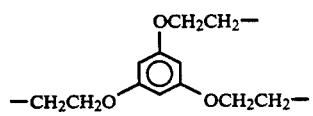 |
| 1,2,3-tripropenyloxyethoxybenzene | 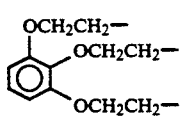 |
| 1,3,4-tripropenyloxyethoxybenzene | 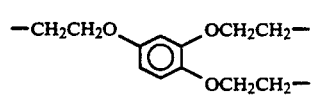 |
| 1,1,1-tris(4-propenyloxyethoxycarbonylphenyl)ethane | 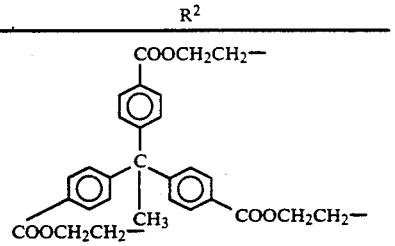 |
| 1,1,1-tris(4-propenyloxyethoxyphenyl)ethane | 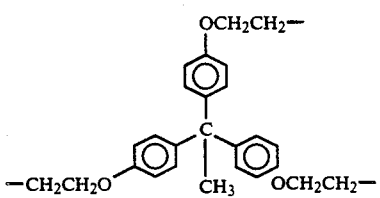 |
| 1,1,2-tris(4-propenyloxyethoxycarbonylphenyl)ethane | 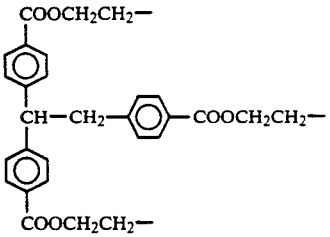 |
| 1,1,1-tris(4-propenyloxyethoxycarbonylphenyl)ethane | 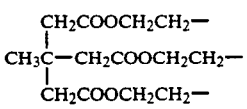 |
| 1,1,2-tris(4-propenyloxyethoxyphenyl)ethane | 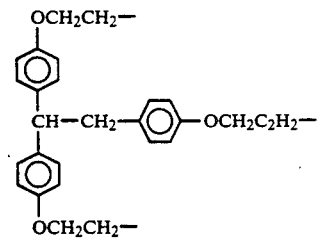 |
| 1,1,1-tris(4-propenyloxyethoxymethyl)ethane | 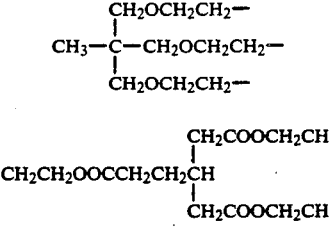 |
| 1,1,2-tris(4-propenyloxyethoxycarbonylmethyl)ethane | 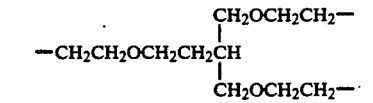 |
| 1,1,2-tris(4-propenyloxyethoxymethyl)ethane | 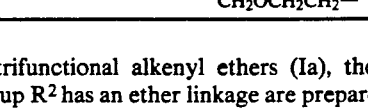 |

Among the trifunctional alkenyl ethers (Ia), those wherein the group R² has an ether linkage are prepared, for example, by reacting a corresponding trifunctional alcohol with 2-chloroethyl vinyl ether or 2-chloroethyl propenyl ether in dimethyl sulfoxide in the presence of sodium hydroxide.

Among the trifunctional alkenyl ethers (Ia), those wherein the group $R^2$ has an ester linkage are prepared, for example, by converting 2-hydroxyethyl vinyl ether or 2-hydroxyethyl propenyl ether to a sodium salt with sodium hydride in toluene, and reacting the salt with a corresponding trifunctional carboxyic acid chloride.

The tetrafunctional alkenyl ethers (Ib'), (Ib") for use in preparing four-branched polymers have the following respective structures.

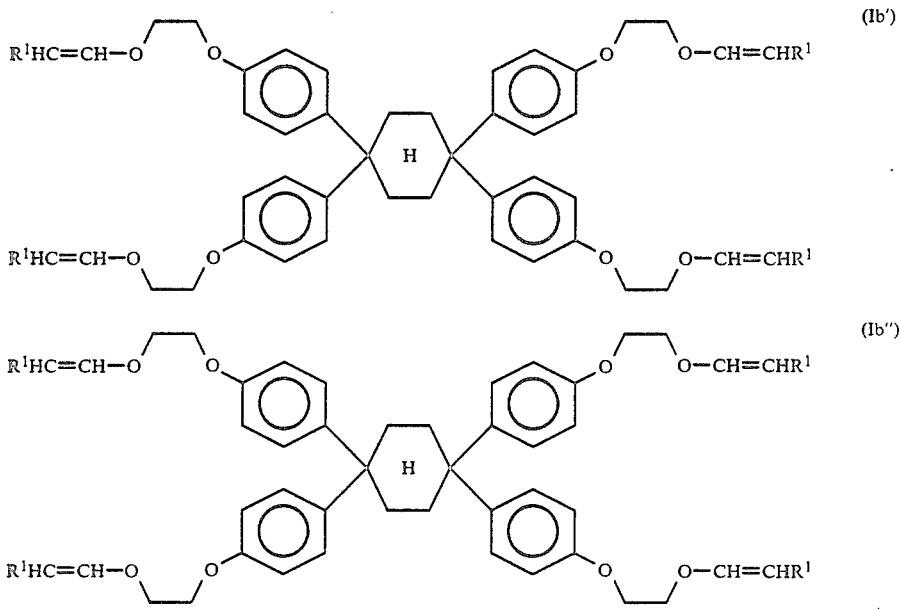

wherein $R^1$ is a hydrogen atom or methyl group.

Examples of tetrafunctional alkenyl ethers (Ib') are as follows.

1,1,4,4-Tetrakis[4-(2-vinyloxy)ethoxyphenyl]cyclohexane, 1,1,4,4-Tetrakis[4-(2-propenyloxy)ethoxyphenyl]cyclohexane.

Examples of tetrafunctional alkenyl ethers (Ib") are as follows.

1,1,3,3-Tetrakis[4-(2-vinyloxy)ethoxyphenylcyclohexane, 1,1,3,3-Tetrakis[4-(2-propenyloxy)ethoxyphenyl]cyclohexane.

The tetrafunctional alkenyl ether (Ib') or (Ib") is prepared, for example, by reacting tetrakis(4-hydroxyphenyl)cyclohexane with chloroethyl vinyl ether oroethyl propenyl ether in dimethyl sulfoxide in the presence of sodium hydroxide.

Examples of cation-donating compounds for use in the process of the invention are $CF_3COOH$, $CCl_3COOH$, $CH_3COOH$, $HCOOH$, $H_3PO_4$, $HOPO(OC_4H_7)_2$, $HOPO(OC_6H_5)_2$, $HOPO(C_6H_5)_2$, $HI$, $HCl$, $HBr$, etc.

The process of the present invention employs as an initiator the adduct of a polyfunctional alkenyl ether (I) with a cation-donating compound, i.e., the adduct of a trifunctional alkenyl ether (Ia) with a cation-donating compound, or the adduct of a tetrafunctional alkenyl ether (Ib') or (Ib") with a cation-donating compound. When the cation-donating compound is represented by HB, the adduct is represented by

    (IV)

wherein $R^1$, $R^2$ and n has the same meaning as above, and B is the portion of the compound remaining after the donation of cation.

Generally, the adduct (IV) is prepared, for example, by dissolving a polyfunctional alkenyl ether (I) in an inert solvent (preferably of the same kind as the solvent to be used for the polymerization reaction), such as carbon tetrachloride, n-hexane or toluene, under dry nitrogen at room temperature, and adding an equivalent amount of the cation-donating compound HB to the solution for reaction. The molar ratio of the trifunctional alkenyl ether (Ia) to the cation-donating compound HB to be added thereto is substantially 1:3. The molar ratio of the tetrafunctional alkenyl ether (Ib'), (Ib") to the cation-donating compound is substantially 1:4. The reaction is conducted at a suitable temperature usually in the range of $-90°$ C. to $100°$ C., generally at atmospheric pressure although an increased pressure is applicable. The reaction time is 10 seconds to 24 hours, preferably 5 minutes to 1 hour. The reaction of this method proceeds rapidly, quantitatively giving a solution of the adduct (IV). Although the adduct (IV) may be isolated from the solution, the solution can be used as it is for the polymerization without isolation.

The polymerization degree of the polymer is dependent on the molar ratio (100% polymerization ratio) of the olefin compound (II) to the adduct (IV), so that the amount of adduct (IV) is critical. The molar ratio of the olefin compound (II) to the adduct (IV) is determined according to the desired polymerization degree, whereby the polymer can be given the desired molecular weight. The molar ratio is at least 3 when the three-branched star compound is to be obtained, or at least 4 when the four-branched star compound is to be obtained. Thus, the molar ratio is suitably determined according to the desired polymerization degree.

Among the alkenyl ethers represented by the formula (IIa) and included in olefin compounds (II) which are monomers for use in the invention for polymerization, those wherein $R^4$ is a monovalent organic group are, for example, as follows.

Methyl, ethyl, n-propyl, isopropyl, n-butyl, isobutyl, sec-butyl, tert-butyl, n-pentyl, isopentyl, 1,2-dimethylpropyl, n-hexyl, isohexyl, 2-ethylbutyl, 1,3-dimethylbutyl, n-heptyl, isoheptyl, n-octyl, 1-methylheptyl, 2-ethylhexyl, n-nonyl, 2-methyloctyl, n-decyl, 1-pentylhexyl, 4-ethyl-1-methyloctyl, n-dodecyl, n-tetradecyl, n-hexadecyl, n-octadecyl, n-eicosyl, n-docosyl and like alkyl groups; cyclohexyl and like cycloalkyl groups; cyclohexylmethyl, terpenyl, menthyl, bornyl, isobornyl and like cycloalkylalkyl groups; benzyl, p-methylbenzyl, p-chlorobenzyl, p-phenylbenzyl, 1-phenylethyl, 2-phenylethyl, 2-phenylpropyl, 3-phenylpropyl, 1,1-dimethylbenzyl, benzhydryl, 3-phenylpropane-2-yl and like aralkyl groups; cinnamyl, 1-methylcinnamyl, 3-methylcinnamyl, 3-phenylcinnamyl, 2-phenylallyl, 1-methyl-2-phenylally and like arylalkenyl groups; phenyl, o-tolyl, m-tolyl, p-tolyl, p-tert-butylphenyl, mesityl, p-isohexylphenyl, p-isooctylphenyl, o-chlorophenyl, m-chlorophenyl, p-chlorophenyl, o-bromophenyl, m-bromophenyl, p-bromophenyl, o-methoxyphenyl, m-methoxyphenyl, p-methoxyphenyl, o-nitrophenyl, m-nitrophenyl, p-nitrophenyl, 2,4-dinitrophenyl and like aryl groups; 1-chloroethyl, 2-chloroethyl, 2-bromoethyl, 2-iodoethyl, 2-fluoroethyl, 2,2,2-trifluoroethyl, 3-chloropropyl and like haloalkyl groups; methoxyethyl, ethoxyethyl, 2-ethoxyethoxyethyl and like alkoxyalkyl groups, and phenoxyethyl, p-chlorophenoxyethyl, p-bromophenoxyethyl, p-fluorophenoxyethyl, p-methoxyphenoxyethyl and like aryloxyalkyl groups; 2-acetoxyethyl, 2-benzoxyethyl, 2-(p-methoxybenzoxy)ethyl, 2-(p-chlorobenzoxy)ethyl and like acryloxyalkyl groups; 2-phthaliminoethyl, 2-(di-tert-butylcarboxyimino)ethyl and like iminoalkyl groups; 2-diethylmalonylethyl, 2-diphenylmalonylethyl and like malonylalkyl groups; 2-acryloxyethyl, 2-methacryloxyethyl, 2-cinnamyloxyethyl, 2-sorbinyloxy and like aryloxyalkyl groups; etc.

Such olefins (IIa) may be used singly, or at least two of them may be used in combination.

The process wherein the olefin (IIa) is used is practiced preferably by employing a method of accelerating the polymerization (living polymerization). There are the following two methods for this purpose.

The first of these methods is a method wherein the living polymerization is conducted in the presence of an organoaluminum compound as a catalyst, with the growing carbocation protected with a Lewis base to thereby prevent a side reaction. In the second method, the living polymerization is conducted, with a Lewis acid used for adjusting the nucleophilic property of the counteranion for the growing carbocation to prevent a side reaction.

These methods will be described below in greater detail.

With the first method, an organoaluminum compound represented by the following formula (V) is used as a catalyst in the presence of a Lewis base.

$$R^5_r AlX_s \qquad (V)$$

wherein $R^5$ is a monovalent organic group, X is a halogen atom, and r and s are each an integer and are in the relation defined by $r+s=3$, $0 \leq r < 3$ and $0 \leq s < 3$.

Examples of useful organoaluminum compounds (V) are trichloro-aluminum, tribromo-aluminum, ethylaluminum dichloride, ethylaluminum dibromide, diethylaluminum chloride, diethylaluminum bromide, ethylaluminum diiodide, ethylaluminum difluoride, methylaluminum dichloride, methylaluminum dibromide, dimethylaluminum chloride, dimethylaluminum bromide and the like. These organoaluminum compounds may be used singly, or at least two of them may be used in combination. The compound is used in such an amount that the molar ratio of the olefin (II) to the organoaluminum compound (V) is generally in the range of 2 to 10,000, preferably in the range of 10 to 5000.

Examples of useful Lewis bases to be present in the reaction system are ethyl acetate, n-butyl acetate, phenyl acetate, ethyl benzoate, ethyl p-chlorobenzoate, ethyl p-methylbenzoate, ethyl p-methoxybenzoate, methyl acetate, isopropyl acetate, tert-butyl acetate and like ester compounds; 1,4-dioxane, diethyl ether, tetrahydrofuran, di-n-hexyl ether, diisopropyl ether, di-n-butyl ether, methoxytoluene, propylene oxide, 1,2-diethoxyethane, 1,2-dibutoxyethane, diethylene glycol dimethyl ether, diethylene glycol diethyl ether, diethylene glycol dibutyl ether, acetal and like ether compounds; pyridine, 2,6-dimethylpyridine, 2-methylpyridine, 2,4,6-trimethylpyridine, 2,4-dimethylpyridine, 2,6-di-tert-butylpyridine and like pyridine derivatives.

These Lewis bases are usably singly, or at least two of them can be used in combination. The base is usable in bulk or as dissolved in an inert solvent. In accordance with the basicity of the Lewis base, the Lewis base is added to the reaction system in such an amount that the ratio of the amount to the amount of alkenyl ether (I) used is in the following range.

$$0.001 \leq \frac{\text{Amount of Lewis base}}{\text{Amount of alkenyl ether } (I)} \leq 100$$

The ratio of the amount of Lewis base used to the amount of alkenyl ether (I) used, if less than 0.001 or over 100, is not desirable since it is then difficult to provide a perfect living polymerization system.

The second method employs a Lewis acid for suitably activating the counteranion for the growing carbocation. Examples of useful Lewis acids are iodine, zinc(II) halides, tin(II) halides, etc., among which $I_2$, $ZnI_2$, $ZnBr_2$, $ZnCl_2$, $SnI_2$ and $SnCl_2$ are especially suitable to use. Such Lewis acids are used singly, or at least two of them are used in combination. The Lewis acid is used in such an amount that the molar ratio of the alkenyl ether (I) to the acid is usually in the range of 2 to 100,000, preferably in the range of 10 to 10,000.

Examples of alkyloxystyrenes represented by the formula (IIb) and included in the olefin compounds (II) for use in the process of the invention are o-methoxystyrene, m-methoxystyrene, p-methoxystyrene, o-ethoxystyrene, m-ethoxystyrene, p-ethoxystyrene, o-n-propyloxystyrene, m-n-propyloxystyrene, p-n-propyloxystyrene, o-isopropyloxystyrene, m-isopropyloxystyrene, p-isopropyloxystyrene, o-n-butoxystyrene, m-n-butoxystyrene, p-n-butoxystyrene, o-tert-butoxystyrene, m-tert-butyoxystyrene, p-tert-butoxystyrene and the like. These styrenes may be used singly or in combination.

In the process wherein the alkyloxystyrene (IIb) is used, the polymerization (living polymerization) is effected using a halide of a bivalent metal as an activating agent.

The metal halide serves to activate the counteranion for the growing carbocation during the polymerization. Examples of useful metal halides are $ZnI_2$, $ZnBr_2$, $ZnCl_2$, $SnI_2$, $SnCl_2$ and the like.

Such metal halides are used singly, or at least two of them are used in combination. The metal halide is used in such an amount that the molar ratio of the polyfunctional alkenyl ether (I) to the metal halide is in the range of 0.01 to 1000, preferably 0.1 to 100.

The polymerization reaction of the present invention is carried out usually by solution polymerization, while other methods, such as bulk polymerization, can also be used. Examples of solvents useful for solution polymerization are n-hexane, cyclohexane, benzene, toluene, carbon tetrachloride, ethylene chloride and like inert solvents. The reaction is conducted at a suitable temperature usually within the range of −40° C. to 100° C., generally at atmospheric pressure although an increased pressure is applicable. The reaction time is 3 seconds to 7 days, preferably 1 minute to 24 hours.

Since the polymerization reaction of the present invention is living polymerization, the polymerization reaction is terminated by adding a polymerization terminator. The polymerization terminator is preferably a compound represented by HZ (wherein Z is the terminator residue), such as methanol, ethanol, propanol, isopropanol, butanol or like alcohol; or dimethylamine, diethylamine or like amine. When methanol is used, it is desirable to use ammonia water in combination therewith. Ammonia acts to deactivate the organoaluminum compound (V), Lewis acid and metal halide. The molar ratio of the polymerization terminator to the cation-donating compound HB is 1 to 10,000, preferably 1 to 1000.

The polymer formed is collected by washing the reaction mixture with an aqueous solution of hydrochloric acid or like acid and then with water, and removing the solvent from the mixture.

The reaction product of the present invention, i.e., star compound, has a polymerization degree x in the range of 1 to 10,000, preferably 4 to 5000, more preferably 10 to 1000, most preferably 10 to 600.

The process of the present invention provides star compounds having three or four branches of uniform length and having a narrow molecular weight distribution. Furthermore, the star compounds prepared by the present process have active polymer ends. This makes it possible, for example, to prepare block copolymers from the present polymer and other polymer, or to introduce a functional group into the present polymer at the terminal position. Depending on the kind of monomer used, the polymer can be made hydrophilic by a reaction of the polymer. Furthermore, a block copolymer can be prepared which comprises hydrophilic blocks and hydrophobic blocks. Thus, the star polymers of the invention are usable for wider application as functional polymers and are expected to find use in prepolymers for novel elastomers, crosslinking agents, ionomers, surfactants, compatibilizing agents, etc.

EXAMPLES

The present invention will be further described with reference to the following examples, in which the molar concentration (mole /1) indicates the amount in moles of the compound used based on the whole volume of the polymerization system, the weight average molecular weight is represented by Mw, and the number average molecular weight by Mn. The Mw, Mn and the ratio Mw/Mn were determined by light diffusion gel permeation chromatography GPC ("LS8000 System," product of Toyo Soda Mfg. Co., Ltd., column: "Polystyrene Gel KF-802, KF-803, KF-804," product of Showa Denko K.K., 8 mm in inside diameter, 300 mm in length). The chemical structure of the polymer was determined by $^1$H-NMR ("GSX-270," product of JEOL, Ltd., 270 MHz). The adducts used in Examples of a polyfunctional alkenyl ether (I) with a cation-donating compound were prepared by dissolving the ether (I) in a fully purified and dried inert solvent (of the same kind as the solvent used for polymerization reaction), adding an equivalent amount of cation-donating compound HB to the solution and stirring the mixture at room temperature in a nitrogen stream for 15 minutes. The adduct obtained was used for polymerization in the form of a solution without isolation.

REFERENCE EXAMPLE 1

Preparation of trifunctional alkenyl ether

A 9.96 g quantity (113 mmoles) of 2-hydroxyethyl vinyl ether was dissolved in 50 ml of toluene in a nitrogen atmosphere within three-necked glass flask equipped with a condenser and a stirrer, 2.71 g (113 mmoles) of sodium hydride powder was added to the solution, and the mixture was stirred at room temperature for 1 hour. To the solution were then added 10.0 g (33.7 mmoles) of trimesic acid chloride and 0.5 g of tetra-n-butylammonium chloride, followed by reaction at 80° C. for 4 hours. The reaction mixture was subjected to extraction with diethyl ether, and the extract was dried to give crude crystals, which were then recrystallized from toluene/hexane (1:1), affording tri(2-vinyloxy)ethyl 1,3,5-benzenetricarboxylate (the first compound in Table 1). Yield: 62%, m.p.: 92°–93° C. (pale yellow crystals), IR absorption spectrum (Nujol): $\nu_{C=C}=1620$ cm$^{-1}$, $\nu_{Ph}=830$ cm$^{31\ 1}$.

REFERENCE EXAMPLE 2

Preparation of trifunctional alkenyl ether

A 10.0 g quantity (32.6 mmoles) of 1,1,1-tris(4-hydroxyphenyl ethane was dissolved in 75 ml of dimethyl sulfoxide in dry nitrogen within a three-necked glass flask equipped with a condenser and a stirrer, 23.5 g (587 mmoles) of sodium hydroxide powder was added to the solution, and the mixture was stirred at 75° C. for 3 hours. To the solution was then added 59.7 ml (587 mmoles) of 2-chloroethyl vinyl ether, and the mixture was reacted at 80° C. for 5 hours. The reaction mixture was purified in the same manner as in Reference Example ]to obtain 1,1,1-tris[4-(2-vinyloxyl)ethoxylphenyl]ethane (the second compound in Table 2).

REFERENCE EXAMPLE 3

Preparation of tetrafunctional alkenyl ether

A 10.0 g quantity (22.1 mmoles) of 1,1,4,4-tetrakis(4-hydroxyphenyl)cyclohexane was dissolved in 75 ml of dimethyl sulfoxide in a nitrogen stream within a three-necked glass flask equipped with a condenser and a stirrer, 21.2 g (530 mmoles) of sodium hydroxide powder was added to the solution, and the mixture was stirred at 75° C. for 3 hours. Subsequently, 53.9 ml (530 mmoles) of 2-chloroethyl vinyl ether was added to the solution and reacted therewith at 80° C. for 5 hours. The reaction mixture was purified in the same manner as in Reference Example I, giving 1,1,4,4-tetrakis[4-(2vinyloxy)ethoxypheny]cyclohexane. Yield: 48%, m.p.: 137.5°–139° C. (pale yellow crystals), IR absorption spectrum (Nujol): $\nu_{C=C}=1620$ cm$^{-1}$, $\nu_{Ph}830$ cm$^{-1}$.

REFERENCE EXAMPLE 4

Preparation of tetrafunctional alkenyl ether 1,1,4,4-Tetrakis4-(2-propenyloxy)ethoxyphenyl]cyclohexane was prepared in the same manner as in Reference Example 3 with the exception of using 63.9 ml (530 mmoles) of 2-chloroethyl propenyl ether in place of 2-chloroethyl vinyl ether.

REFERENCE EXAMPLE 5

Preparation of tetrafunctional alkenyl ether 1,1,3,3-Tetrakis[4-(2-vinyloxy)ethoxyphenyl]cyclohexane was prepared in the same manner as in Reference Example 3 with the exception of using 10.0 g (22.1 mmoles) of 1,1,3,3-tetrakis(4-hydroxyphenyl)cyclohexane instead of 1,1,4,4-tetrakis(4-hydroxyphenyl)cyclohexane.

EXAMPLE 1

A 2.0 ml quantity (3.0 moles/l) of isobutyl vinyl ether was dissolved in 1.5 ml of n-hexane fully purified and dried in a nitrogen atmosphere. With addition of 0.5 ml (1.2 moles/l) of 1,4-dioxane, the solution was maintained at a temperature of 0° C. To the solution were added first 0.5 ml (1.7 mmoles/l) of the adduct of 1,1,1-tris[4-(2-vinyloxy)ethoxyphenyl]ethane (the second compound in Table 2) with trifluoroacetic acid (CF₃COOH), as diluted with n-hexane, and then 0.5 ml (1.7 mmoles/l) of hexane solution of ethylaluminum dichloride to initiate polymerization, which was continued at 0° C. for 3 hours. Methanol (170 mmoles/l) containing a small amount of ammonia water was thereafter added to the reaction system to terminate the polymerization. The reaction mixture was washed with an aqueous solution of hydrochloric acid (8 vol. %) first and then with water, followed by the removal of the catalyst residue and then by the removal of the solvent, etc. by evaporation to collect a polymer.

The above procedure gave a three-branched star polyisobutyl vinyl ether which was $1.6 \times 10^5$ in Mn and 1.04 in Mw/Mn. The Mn value was in good agreement with the value of $1.8 \times 10^5$ which was calculated on the assumption that one molecule of the adduct formed a three-branched molecule. Values Obtained by ¹H-NMR Spectroscopy (270 MHz, CDCl₃)

(Trifunctional vinyl ether)

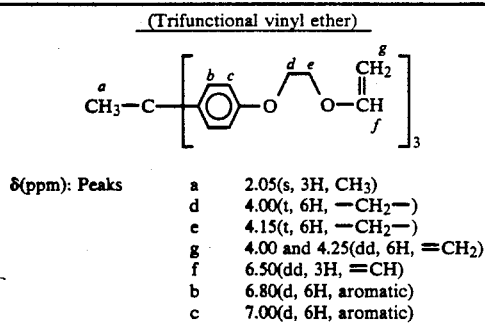

| δ(ppm): Peaks | a | 2.05(s, 3H, CH₃) |
|---|---|---|
| | d | 4.00(t, 6H, —CH₂—) |
| | e | 4.15(t, 6H, —CH₂—) |
| | g | 4.00 and 4.25(dd, 6H, =CH₂) |
| | f | 6.50(dd, 3H, =CH) |
| | b | 6.80(d, 6H, aromatic) |
| | c | 7.00(d, 6H, aromatic) |

(Trifunctional initiator)

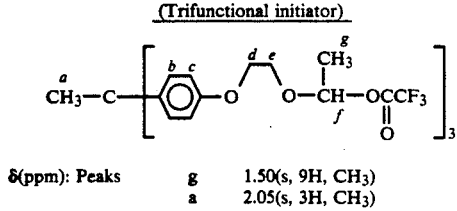

| δ(ppm): Peaks | g | 1.50(s, 9H, CH₃) |
|---|---|---|
| | a | 2.05(s, 3H, CH₃) |
| | d + e | 4.00(m, 12H, —CH₂—) |
| | f | 6.15(q, 3H, CH) |
| | b | 6.70(d, 6H, aromatic) |
| | c | 6.90(d, 6H, aromatic) |

(Three-branched polyvinyl ether)

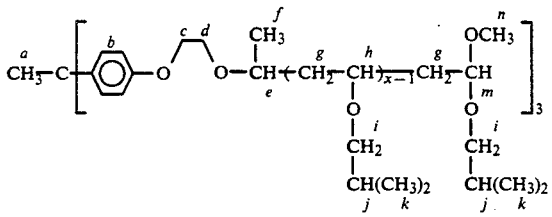

| δ(ppm): Peaks | k | 0.90(18xH, CH₃) |
|---|---|---|
| | f | 1.20(9H, CH₃) |
| | g + j | 1.40–2.00(9xH, —CH₂—) |
| | a | 2.10(3H, CH₃) |
| | d,e,h,i,n | 3.00–4.00 |
| | c | 4.10(6H, —CH₂—) |
| | m | 4.65(3H, CH) |
| | b | 6.75–7.00(12H, aromatic) |

EXAMPLE 2

A 1.0 ml quantity (1.5 moles/l) of isobutyl vinyl ether was dissolved in 2.5 ml of n-hexane fully purified and dried in a nitrogen atmosphere. With addition of 0.5 ml (1.2 moles/l) of 1,4-dioxane, the solution was maintained at a temperature of 0° C. To the solution were added first 0.5 ml (3.5 mmoles/l) of the adduct of tri(2-vinyloxy)ethyl 1,3,5-benzenetricarboxylate (the first compound in Table 1) with trifluoroacetic acid, as diluted with n-hexane, and then 0.5 ml (10 mmoles/l) of hexane solution of ethylaluminum dichloride to initiate polymerization. The same procedure as in Example 1 was thereafter followed to obtain a polymer.

The above process afforded a three-branched star polyisobutyl vinyl ether which was $3.8 \times 10^4$ in Mn and 1.12 in Mw/Mn. The Mn value was in good agreement with the value of $3.9 \times 10^4$ which was calculated assuming that one molecule of the adduct formed a three-branched molecule.

Further to substantiate that the three-branched star polyisobutyl vinyl ether was a polymer having branches of uniform length, the three ester linkages in the organic group R² in the center of the star polymer were hydrolyzed by immersing the polymer in an aqueous solution of sodium hydroxide at room temperature for 2 days with stirring. The branched polymer obtained was $1.3 \times 10^4$ in Mn and 1.06 in Mw/Mn. This indicated that the three-branched star polyisobutyl vinyl ether was a polymer having three branches of uniform length.

EXAMPLE 3

A 1.0 ml quantity (0.38 mole/l) of toluene solution of methyl vinyl ether was added to 2.50 ml of toluene fully purified and dried in a nitrogen atmosphere. To the solution was then added 0.5 ml (1.2 moles/l) of 1,4-dioxane. Further added to the solution were 0.5 ml (3.5 mmoles/l) of the same adduct as used in Example 1, and 0.5 ml (10 mmoles/l) of hexane solution of ethylaluminum dichloride to initiate polymerization at −15° C. The polymerization was continued for 3 hours, followed by the same procedure as in Example 1 to obtain a polymer.

Consequently, a hydrophilic three-branched star polymethyl vinyl ether was prepared which was $6.7 \times 10^3$ in Mn and 1.05 in Mw/Mn. The Mn value agreed well with the value of $6.9 \times 10^3$ which was calculated assuming that one molecule of the adduct formed a three-branched molecule.

EXAMPLE 4

A polymer was prepared by the same procedure as in Example 1 except that the polymerization was conducted at a temperature of 60° C. for 10 minutes.

The polymer obtained was a three-branched star polyisobutyl vinyl ether which was $1.5 \times 10^5$ in Mn and 1.10 in Mw/Mn. The Mn value agreed well with the value of $1.8 \times 10^5$ which was calculated assuming that one molecule of the adduct formed a three-branched molecule.

EXAMPLE 5

A 0.25 ml quantity (0.35 mole/l) of isobutyl vinyl ether was dissolved in 3.25 ml of n-hexane fully purified and dried in a nitrogen atmosphere. A 0.5 ml quantity (1.2 moles/l) of 1,4-dioxane was added to the solution. Further added to the solution were 0.5 ml (3.5 mmoles/l) of the same adduct as used in Example 1 and 0.5 ml (10 mmoles/l) of hexane solution of ethylaluminum dichloride to initiate polymerization at 0° C. Three minutes after the start of the reaction, 0.25 ml (0.38 mole/l) of 2-vinyloxyethyl acetate was added to the mixture, followed by further polymerization at a temperature of 40° C. for 3 hours. The same procedure as in Example 1 was thereafter repeated to obtain a polymer.

The polymer was a three-branched star block copolymer which was $2.8 \times 10^4$ in Mn and 1.04 in Mw/Mn. The Mn value agreed well with the value of $2.6 \times 10^4$ which was calculated assuming that one molecule of the adduct formed a three-branched molecule.

The polymer was further hydrolyzed with an alkali to convert the poly-2-acetoxyethyl vinyl ether on the outer side to poly-2-hydroxyethyl vinyl ether and obtain an amphiphatic three-branched star polymer having hydrophobic groups internally and hydrophilic groups externally.

EXAMPLE 6

The procedure of Example 5 was repeated with the exception of using 0.25 ml (0.38 mole/l) of 2-vinyloxyethyl acetate first in place of isobutyl vinyl ether to effect polymerization at 40° C. for 2 hours, followed by addition of 0.25 ml (0.38 mole/l) of isobutyl vinyl ether to effect further polymerization at 40° C. for 1 hour.

As a result, a three-branched star block copolymer was obtained which was $2.3 \times 10^4$ in Mn and 1.11 in Mw/Mn. The Mn value agreed well with the value of $2.6 \times 10^4$ which was calculated assuming that one molecule of the adduct formed a three-branched molecule.

The polymer was further hydrolyzed with an alkali to convert the poly-2-acetoxyethyl vinyl ether on the inner side to poly-2-hydroxyethyl vinyl ether and prepare an amphiphatic three-branched star polymer having hydrophilic groups internally and hydrophobic groups externally.

EXAMPLE 7

A 0.5 ml quantity (0.76 mole/l) of isobutyl vinyl ether was dissolved in 3.5 ml of toluene fully purified and dried in a nitrogen atmosphere, and the solution was maintained at a temperature of $-15°$ C. To the solution were added first 0.5 ml (3.0 mmoles/l) of the adduct of 1,1,1-tris[4-(2-vinyloxy)ethoxyphenyl]ethane (the second compound in Table 2) with hydrogen iodide, as diluted with toluene, and then an ethereal solution (0.2 mmole/l) of zinc iodide ($ZnI_2$) to effect polymerization at $-15°$ C. for 1 hour. Methanol (300 mmoles/l) containing a small amount of ammonia was then added to the reaction system to terminate the polymerization. The reaction mixture was washed with a sodium thiosulfate aqueous solution (8 vol. %) first then with water, followed by the removal of the catalyst residue and thereafter by the removal of the solvent, etc. by evaporation to obtain a product.

The product obtained was a three-branched star polyisobutyl vinyl ether which was $2.8 \times 10^4$ in Mn and 1.04 in Mw/Mn. The Mn value agreed well with the valuce of $2.6 \times 10^4$ which was calculated assuming that one molecule of the adduct formed a three-branched molecule.

EXAMPLE 8

The same procedure as in Example 7 was repeated with the exception of using the adduct (3.0 mmoles/l) of tri(2-vinyloxy)ethyl 1,3,5-benzenetricarboxylate (the first compound in Table 1) with hydrogen iodide, as diluted with toluene, in place of the adduct used in Example 7. Consequently, a three-branched star polyisobutyl vinyl ether was obtained which was $3.3 \times 10^4$ in Mn and 1.04 in Mw/Mn.

EXAMPLE 9

A 0.25 ml quantity (0.38 mole/l) of 2-vinyloxyethyl acetate was dissolved in 3.0 ml of toluene fully purified and dried in a nitrogen atmosphere, and the solution was maintained at a temperature of $-15°$ C. To the solution were added first 0.5 ml (3.0 mmoles/l) of the same adduct as used in Example 5, and then a toluene solution (9.0 mmoles/l) of iodine ($I_2$) to start polymerization. After continuing the polymerization at $-15°$ C. for 1 hour, the same procedure as in Example 5 was repeated to prepare a polymer.

The polymer obtained was a three-branched star poly-2-acetoxyethy vinyl ether which was $1.9 \times 10^4$ in Mn and 1.08 in Mw/Mn. The Mn value agreed well with the value of $1.7 \times 10^4$ which was calculated assuming that one molecule of the adduct formed a three-branched molecule.

EXAMPLE 10

A 0.25 ml quantity (0.38 mole/l) of p-methoxystyrene was dissolved in 3.75 ml of toluene fully purified and dried in a nitrogen atmosphere, and the solution was maintained at a temperature of $-78°$ C. To the solution were added first 0.5 ml (3.3 mmoles/l) of the adduct of 1,1,1-tris[4-(2-vinyloxy)ethoxyphenyl]ethane (the second compound in Table 2) with hydrogen iodide, as diluted with toluene, and then 0.5 ml (3.3 mmoles/l) of ethereal solution of zinc iodide. The resulting solution was allowed to stand at $-78°$ C. for 20 hours and thereafter heated to $-15°$ C. to start polymerization. After continuing the polymerization at $-15°$ C. for 2 hours, methanol (330 mmoles/l) containing a small amount of ammonia water was added to the reaction system to terminate the polymerization and obtain a mixture containing a polymer. The mixture was washed first with hydrochloric acid aqueous solution (8 vol. and then with water, and the solvent, etc. were evaporated off the mixture to collect the polymer.

GPC and $^1$H-NMR spectroscopy revealed that the polymer obtained was a three-branched star poly(p- methoxystyrene) which was $1.4 \times 10^4$ in Mn and 1.05 in Mw/Mn. The Mn value agreed well with the value of $1.5 \times 10^4$ which was calculated assuming that one molecule of the adduct formed a three-branched molecule. Values Obtained by $^1$H-NMR Spectroscopy (270 MHz, CDCl$_3$)

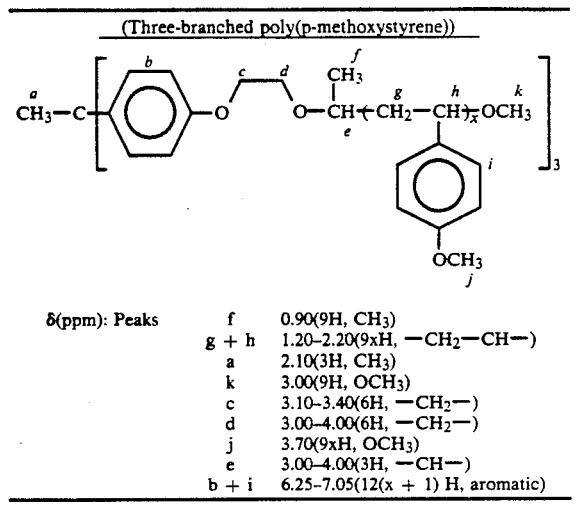

(Three-branched poly(p-methoxystyrene))

| $\delta$(ppm): Peaks | | |
|---|---|---|
| | f | 0.90(9H, CH$_3$) |
| | g + h | 1.20-2.20(9xH, —CH$_2$—CH—) |
| | a | 2.10(3H, CH$_3$) |
| | k | 3.00(9H, OCH$_3$) |
| | c | 3.10-3.40(6H, —CH$_2$—) |
| | d | 3.00-4.00(6H, —CH$_2$—) |
| | j | 3.70(9xH, OCH$_3$) |
| | e | 3.00-4.00(3H, —CH—) |
| | b + i | 6.25-7.05(12(x + 1) H, aromatic) |

EXAMPLE 11

A polymer was prepared in the same manner as in Example 10 with the exception of using tri(2-vinyloxy)ethyl 1,3,5-benzenetricarboxylate (the first compound in Table 1) instead of the trifunctional alkenyl ether used in Example 10.

GPC and $^1$H-NMR spectroscopy revealed that the polymer obtained was a three-branched star poly(p-methoxystyrene) which was $1.6 \times 10^4$ in Mn and 1.06 in Mw/Mn. The Mn value agreed well with the value of $1.5 \times 10^4$ which was calculated assuming that one molecule of the adduct formed a three-branched molecule.

The three-branched star poly(p-methoxystyrene) was immersed in a sodium hydroxide aqueous solution at room temperature for 2 days to hydrolyze the three ester linkages in the center of the three branches and obtain a branched polymer. When analyzed by GPC, the branched polymer was found to be $5.0 \times 10^3$ in Mn and 1.07 in Mw/Mn.

EXAMPLE 12

A polymer was prepared in the same manner as in Example 10 with the exception of using hydrogen chloride in place of hydrogen iodide, and zinc chloride in place of zinc iodide, and effecting the polymerization at a temperature of 0° C. for 20 minutes.

GPC and $^1$H-NMR spectroscopy revealed that the polymer obtained was a three-branched star poly(p-methoxystyrene) which was $1.4 \times 10^4$ in Mn and 1.06 in Mw/Mn. The Mn value agreed well with the value of $1.5 \times 10^4$ which was calculated assuming that one molecule of the adduct formed a three-branched molecule.

EXAMPLE 13

A polymer was prepared in the same manner as in Example 10 except that p-tert-butoxystyrene (0.26 mole/l) was polymerized in place of p-methoxystyrene (0.38 mole/l) at a temperature of 25° C.

GPC and $^1$H-NMR spectroscopy revealed that the polymer obtained was three-branched star poly(p-tert-butoxystyrene) which was $1.3 \times 10^4$ in Mn and 1.07 in Mw/Mn. The Mn value agreed well with the value of $1.4 \times 10^4$ calculated assuming that one molecule of the adduct formed a three-branched molecule.

EXAMPLE 14 p-Methoxystyrene was polymerized in the same manner as in Example 10, and 25 ml (0.26 mole/l) of p-tert-butoxystyrene was thereafter added to the reaction mixture and further polymerized therewith at an elevated temperature of 25° C. Subsequently, methanol (330 mmoles/l) containing a small amount of ammonia water was added to the reaction system to terminate the polymerization and obtain a mixture containing a polymer. The mixture was washed first with a hydrochloric acid aqueous solution (8 vol. %) and then with water, followed by evaporation for the removal of the solvent, etc. to collect the polymer.

GPC and $^1$H-NMR spectroscopy revealed that the polymer obtained was a three-branched star block copolymer comprising poly(p-methoxystyrene) and poly(p-tert-butoxystyrene), and $3.0 \times 10^4$ in Mn and 1.05 in Mw/Mn.

The Mn value agreed well with the value of $2.9 \times 10^4$ which was calculated assuming that one molecule of the adduct formed a three-branched molecule.

The copolymer was further treated with hydrogen bromide to convert poly(p-tert-butoxystyrene) on the outer side to poly(p-vinylphenol) and obtain an amphiphatic three-branched star copolymer having hydrophobic groups internally and hydrophilic groups externally.

EXAMPLE 15

In the same manner as in Example 10 with the exception of using p-tert-butoxystyrene (0.26 mole/l) instead of p-methoxystyrene (0.38 mole/l) at a temperature of 25° C., the p-tert-butoxystyrene was polymerized. Subsequently, 25 ml (0.38 mole/l) of p-methoxystyrene was added to the reaction mixture and further reacted therewith at 25° C. for 20 minutes. Methanol (330 mmoles/l) containing a small amount of ammonia water was thereafter added to the reaction system to terminate the polymerization and obtain a mixture containing a polymer. The mixture was washed first with a hydrochloric acid aqueous solution (8 vol. %) and then with water, followed by evaporation for the removal of the solvent, etc. to collect the polymer.

GPC and $^1$H-NMR spectroscopy revealed that the polymer obtained was a three-branched star block copolymer comprising poly(p-tert-butoxystyrene) and poly(p-methoxystyrene), and $2.8 \times 10^4$ in Mn and 1.06 in Mw/Mn.

The Mn value agreed well with the value of $2.9 \times 10^4$ which was calculated assuming that one molecule of the adduct formed a three-branched molecule.

The copolymer was further treated with hydrogen bromide to convert the poly(p-tert-butoxystyrene) in the inside to poly(p-vinylphenol) and obtain an amphiphatic three-branched star copolymer having hydrophilic groups internally and hydrophobic groups externally.

EXAMPLE 16

A 2.0 ml quantity (3.0 moles/l) of isobutyl vinyl ether was dissolved in 1.5 ml of n-hexane fully purified and dried in a nitrogen atmosphere, 0.5 ml (1.2 moles/l) of 1,4-dioxane was added to the solution, and the resulting solution was maintained at a temperature of 0° C. To the solution were added first 0.5 ml (1.7 mmoles/l) of the adduct of 1,1,4,4-tetrakis[4-(2-vinyloxy)ethoxyphenyl]-cyclohexane with trifluoroacetic acid (CF₃COOH), as diluted with n-hexane, and then 0.5 ml (5.0 mmoles/l) of hexane solution of ethylaluminum dichloride to start polymerization. After continuing the polymerization at 0° C. for 3 hours, methanol (330 mmoles/l) containing a small amount of ammonia water was added to the reaction system to terminate the polymerization. The reaction mixture was washed first with a hydrochloric acid aqueous solution (8 vol. %) and then with water, followed by the removal of the catalyst residue and then by the removal of the solvent, etc. by evaporation to collect a polymer.

The polymer obtained was a four-branched star polyisobutyl vinyl ether which was $1.6 \times 10^5$ in Mn and 1.06 in Mw/Mn. The Mn value agreed well with the value of $1.8 \times 10^5$ which was calculated assuming that one molecule of the adduct formed a four-branched molecule. Values obtained by ¹H-NMR Spectroscopy (270 MHz, CDCl₃)

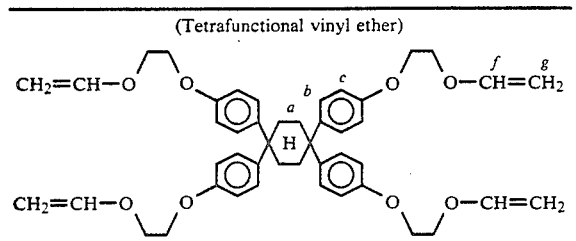

(Tetrafunctional vinyl ether)

| δ(ppm): Peaks | a | 2.25(m, 8H, cyclohexane ring) |
|---|---|---|
| | d | 4.00(t, 8H, —CH₂—) |
| | e | 4.15(t, 8H, —CH₂—) |
| | g | 4.00 and 4.25(dd, 8H, =CH₂) |
| | f | 6.50(dd, 4H, =CH) |
| | b | 6.80(d, 8H, aromatic) |
| | c | 7.00(d, 8H, aromatic) |

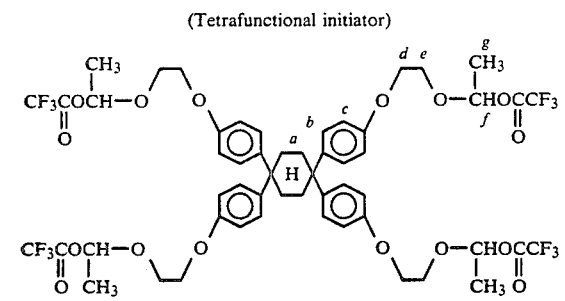

(Tetrafunctional initiator)

| δ(ppm): Peaks | g | 1.50(s, 12H, CH₃) |
|---|---|---|
| | a | 2.25(m, 8H, cyclohexane ring) |
| | d + e | 4.00(m, 16H, —CH₂—) |
| | f | 6.15(q, 4H, CH) |
| | b | 6.70(d, 8H, aromatic) |
| | c | 6.90(d, 8H, aromatic) |

(Four-branched polyvinyl ether)

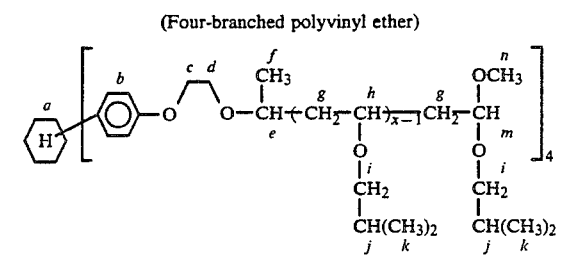

| δ(ppm): Peaks | k | 0.90(24×H, CH₃) |
|---|---|---|
| | f | 1.20(12H, CH₃) |
| | g + j | 1.40–2.00(12×H, —CH₂—) |
| | a | 2.10–2.40(8H, cyclohexane ring) |
| | d,e,h,i,n | 3.00–4.00 |
| | c | 4.10(8H, —CH₂—) |
| | m | 4.65(4H, CH) |
| | b | 6.75–7.00(16H, aromatic) |

EXAMPLE 17

A 1.0 ml quantity (1.5 moles/l) of isobutyl ether was dissolved in 2.5 ml of n-hexane fully purified and dried in a nitrogen atmosphere. With addition of 0.5 ml (1.2 moles/l) of 1,4-dioxane, the solution was maintained at a temperature of 0° C. To the solution were added first 0.5 ml (3.5 mmoles/l) of the adduct of 1,1,4,4-tetrakis4-(2-propenyloxy) ethoxyphenyl]cyclohexane with trifluoroacetic acid, as diluted with n-hexane, and then 0.5 ml (10 mmoles/l) of hexane solution of ethylaluminum dichloride to initiate polymerization. The same procedure as in Example 16 was thereafter followed to obtain a polymer.

The above process afforded a four-branched star polyisobutyl vinyl ether which was $3.7 \times 10^4$ in Mn and 1.08 in Mw/Mn. The Mn value was in good agreement with the value of $3.9 \times 10^4$ which was calculated assuming that one molecule of the adduct formed a four branched molecule.

EXAMPLE 18

A 1.0 ml quantity (0.38 mole/l) of toluene solution of methyl vinyl ether was added to 2.50 ml of toluene fully purified and dried in a nitrogen atmosphere. To the solution was then added 0.5 ml (1.2 moles/l) of 1,4-dioxane. Further added to the solution were 0.5 ml (3.5 mmoles/l) of the same adduct as used in Example 16 and 0.5 ml (10 mmoles/l) of hexane solution of ethylaluminum dichloride to initiate polymerization at −15° C. The polymerization was continued for 3 hours, followed by the same procedure as in Example 16 to obtain a polymer.

Consequently, a hydrophilic four-branched star polymethyl vinyl ether was prepared which was $6.6 \times 10^3$ in Mn and 1.06 in Mw/Mn. The Mn value agreed well with the value of $6.9 \times 10^3$ which was calculated assuming that one molecule of the adduct formed a four-branched molecule.

EXAMPLE 19

A polymer was prepared by the same procedure as in Example 16 except that the polymerization was conducted at a temperature of 60° C. for 10 minutes.

The polymer obtained was a four-branched star polyisobutyl vinyl ether which was $1.6 \times 10^5$ in Mn and 1.10 in Mw/Mn. The Mn value agreed well with the value of $1.8 \times 10^5$ which was calculated assuming that one molecule of the adduct formed a four-branched molecule.

EXAMPLE 20

A 0.25 ml quantity (0.35 mole/l) of isobutyl vinyl ether was dissolved in 3.25 ml of n-hexane fully purified and dried in a nitrogen atmosphere. A 0.5 ml quantity (1.2 moles/l) of 1,4-dioxane was added to the solution. Further added to the solution were 0.5 ml (3.5 moles/l) of the same adduct as used in Example 16 and 0.5 ml (10 mmoles/l) of hexane solution of ethylaluminum dichloride to initiate polymerization at 0° C. Three minutes after the start of the reaction, 0.25 ml (0.38 mole/l) of 2-vinyloxyethyl acetate was added to the mixture, followed by further polymerization at a temperature of 40° C. for 3 hours. The same procedure as in Example 16 was thereafter repeated to obtain a polymer.

The polymer was a four-branched star block copolymer which was $2.6 \times 10^4$ in Mn and 1.06 in Mw/Mn. The Mn value agreed well with the value of $2.6 \times 10^4$ which was calculated assuming that one molecule of the adduct formed a four-branched molecule.

The polymer was further hydrolyzed with an alkali to convert the poly-2-acetoxyethyl vinyl ether on the outer side to poly-2-hydroxyethyl vinyl ether and obtain an amphiphatic four-branched star polymer having hydrophobic groups internally and hydrophilic groups externally.

EXAMPLE 21

The procedure of Example 20 was repeated with the exception of using 0.25 ml (0.38 mole/l) of 2-vinyloxyethyl acetate first in place of isobutyl vinyl ether to effect polymerization at 40° C. for 2 hours, followed by addition of 0.25 ml (0.38 mole/l) of isobutyl vinyl ether to effect further polymerization at 40° C. for 1 hour.

As a result, a four-branched star block copolymer was obtained which was $2.4 \times 10^4$ in Mn and 1.10 in Mw/Mn. The Mn value agreed well with the value of $2.6 \times 10^4$ which was calculated assuming that one molecule of the adduct formed a four-branched molecule.

The polymer was further hydrolyzed with an alkali to convert the poly-2-acetoxyethyl vinyl ether on the inner side to poly-2-hydroxyethyl vinyl ether and prepare an amphiphatic four-branched star polymer having hydrophilic groups internally and hydrophobic groups externally.

EXAMPLE 22

A 0.5 ml quantity (0.76 mole/l) of isobutyl vinyl ether was dissolved in 3.5 ml of toluene fully purified and dried in a nitrogen atmosphere, and the solution was maintained at a temperature of $-15°$ C. To the solution were added first 0.5 ml (3.0 mmoles/l) of the adduct of 1,1,4,4-tetrakis[4-(2-vinyloxy)ethoxyphenyl]-cyclohexane with hydrogen iodide, as diluted with toluene, and then an ethereal solution (0.2 mmole/l) of zinc iodide ($ZnI_2$) to effect polymerization at $-15°$ C. for 1 hour. Methanol (300 mmoles/l) containing a small amount of ammonia was then added to the reaction system to terminate the polymerization. The reaction mixture was washed with a sodium thiosulfate aqueous solution (8 vol. %) first then with water, followed by the removal of the catalyst residue and thereafter by the removal of the solvent, etc. by evaporation to obtain a product.

The product obtained was a four-branched star polyisobutyl vinyl ether which was $2.4 \times 10^4$ in Mn and 1.06 in Mw/Mn. The Mn value agreed well with the valuce of $2.6 \times 10^4$ which was calculated assuming that one molecule of the adduct formed a four-branched molecule.

EXAMPLE 23

The same procedure as in Example 22 was repeated with the exception of using the adduct (3.0 mmoles/l) of 1,1,4,4-tetrakis[4-(2-propenyloxy)ethoxyphenyl]cyclohexane with hydrogen iodide, as diluted with toluene, in place of the adduct used in Example 22 Consequently, a four-branched star polyisobutyl vinyl ether was obtained which was $2.8 \times 10^4$ in Mn and 1.07 in Mw/Mn.

EXAMPLE 24

A 0.25 ml quantity (0.38 mole/l) of 2-vinyloxyethyl ethyl acetate was dissolved in 3.0 ml of toluene fully purified and dried in a nitrogen atmosphere, and the solution was maintained at a temperature of $-15°$ C. To the solution were added first 0.5 ml (3.0 mmoles/l) of the same adduct as used in Example 22 and then a toluene solution (9.0 mmoles/l) of iodine ($I_2$) to start polymerization. After continuing the polymerization at $-15°$ C. for 1 hour, the same procedure as in Example 22 was repeated to prepare a polymer.

The polymer obtained was a four-branched star poly-2-acetoxyethy vinyl ether which was $1.6 \times 10^4$ in Mn and 1.06 in Mw/Mn. The Mn value agreed well with the value of $1.7 \times 10^4$ which was calculated assuming that one molecule of the adduct formed a four-branched molecule.

EXAMPLE 25

A 0.25 ml quantity (0.38 mole/l) of p-methoxystyrene was dissolved in 3.75 ml of toluene fully purified and dried in a nitrogen atmosphere, and the solution was maintained at a temperature of $-78°$ C. To the solution were added first 0.5 ml (3.3 mmoles/l) of the adduct of 1,1,4,4-tetrakis[4-(2-vinyloxy)ethoxyphenyl]-cyclohexane with hydrogen iodide, as diluted with toluene, and then 0.5 ml (3.3 mmoles/l) of ethereal solution of zinc iodide. The resulting solution was allowed to stand at $-78°$ C. for 20 hours and thereafter heated to $-15°$ C. to start polymerization. After continuing the polymerization at $-15°$ C. for 2 hours, methanol (330 mmoles/l) containing a small amount of ammonia water was added to the reaction system to terminate the polymerization and obtain a mixture containing a polymer. The mixture was washed first with sodiumith sulfate aqueous solution (8 vol. and then with water, and the solvent, etc. were evaporated off the mixture to collect the polymer.

GPC and $^1$H-NMR spectroscopy revealed that the polymer obtained was a four-branched star poly(p-methoxystyrene) which was $1.5 \times 10^4$ in Mn and 1.05 in Mw/Mn. The Mn value agreed well with the value of $1.5 \times 10^4$ which was calculated assuming that one molecule of the adduct formed a four-branched molecule. Values Obtained by $^1$H-NMR Spectroscopy (270 MHz, $CDCl_3$)

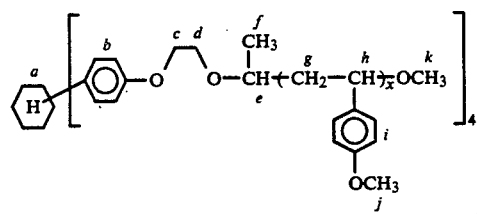

| δ(ppm): Peaks | | |
|---|---|---|
| | f | 0.90(12H, $CH_3$) |
| | g + h | 1.20– 2.20(12×H, $-CH_2-CH-$) |
| | a | 2.10– 2.40(8H, cyclohexane ring) |
| | k | 3.00(12H, $OCH_3$) |
| | c | 3.10–3.40(8H, $-CH_2-$) |
| | d | 3.00–4.00(8H, $-CH_2-$) |
| | j | 3.70(12×H, $OCH_3$) |
| | e | 3.00 4.00(4H, $-CH-$) |

-continued

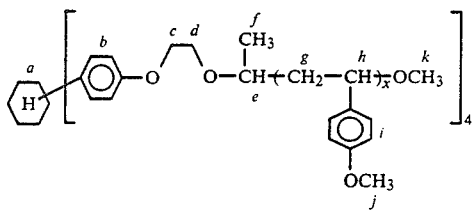

| b + i | 6.25–7.05(16(x+1)H, aromatic) |

EXAMPLE 26

A polymer was prepared in the same manner as in Example 10 with the exception of using 1,1,3,3-tetrakis[4-(2-vinyloxy)ethoxyphenyl]cyclohexane instead of the trifunctional alkenyl ether used in Example 25.

GPC and $^1$H-NMR spectroscopy revealed that the polymer obtained was a four-branched star poly(p-methoxystyrene) which was $1.4 \times 10^4$ in Mn and 1.09 in Mw/Mn. The Mn value agreed well with the value of $1.5 \times 10^4$ which was calculated assuming that one molecule of the adduct formed a four -branched molecule.

EXAMPLE 27

A polymer was prepared in the same manner as in Example 25 with the exception of using hydrogen chloride in place of hydrogen iodide, and zinc chloride in place of zinc iodide, and effecting the polymerization at a temperature of 0° C. for 20 minutes.

GPC and $^1$H-NMR spectroscopy revealed that the polymer obtained was a four-branched star poly(p-methoxystyrene) which was $1.4 \times 10^4$ in Mn and 1.05 in Mw/Mn. The Mn value agreed well with the value of $1.5 \times 10^4$ which was calculated assuming that one molecule of the adduct formed a four-branched molecule.

EXAMPLE 28

A polymer was prepared in the same manner as in Example 25 except that p-tert-butyxystyrene (0.26 mole/1) was polymerized in place of p-methoxystyrene (0.38 mole/1) at a temperature of 25° C.

GPC and $^1$H-NMR spectroscopy revealed that the polymer obtained was four-branched star poly(p-tert-butoxystyrene) which was $1.4 \times 10^4$ in Mn and 1.06 in Mw/Mn. The Mn value agreed well with the value of $1.4 \times 10^4$ calculated assuming that one molecule of the adduct formed a four-branched molecule.

EXAMPLE 29 p-Methoxystyrene was polymerized in the same manner as in Example 25 and 25 ml (0.26 mole/1) of p-tert-butoxystyrene was thereafter added to the reaction mixture and further polymerized therewith at an elevated temperature of 25° C. Subsequently, methanol (330 mmoles/1) containing a small amount of ammonia water was added to the reaction system to terminate the polymerization and obtain a mixture containing a polymer. The mixture was washed first with a hydrochloric acid aqueous solution (8 vol. %) and then with water, followed by evaporation for the removal of the solvent, etc. to collect the polymer.

GPC and $^1$H-NMR spectroscopy revealed that the polymer obtained was a four -branched star block copolymer comprising poly(p-methoxystyrene) and poly(p-tert-butoxystyrene), and $2.8 \times 10^4$ in Mn and 1.05 in Mw/Mn.

The Mn value agreed well with the value of $2.9 \times 10^4$ which was calculated assuming that one molecule of the adduct formed a four -branched molecule.

The copolymer was further treated with hydrogen bromide to convert poly(p-tert-butoxystyrene) on the outer side to poly(p-vinylphenol) and obtain an amphiphatic four -branched star copolymer having hydrophobic groups internally and hydrophilic groups externally.

EXAMPLE 30

In the same manner as in Example 25 with the exception of using p-tert-butoxystyrene (0.26 mole/1) instead of p-methoxystyrene (0.38 mole/1) at a temperature of 25° C., the p-tert-butoxystyrene was polymerized. Subsequently, 25 ml (0.38 mole/1) of p-methoxystyrene was added to the reaction mixture and further reacted therewith at 25° C. for 20 minutes. Methanol (330 mmoles/1) containing a small amount of ammonia water was thereafter added to the reaction system to terminate the polymerization and obtain a mixture containing a polymer. The mixture was washed first with a hydrochloric acid aqueous solution (8 vol. %) and then with water, followed by evaporation for the removal of the solvent, etc. to collect the polymer.

GPC and $^1$H-NMR spectroscopy revealed that the polymer obtained was a four-branched star block copolymer comprising poly(p-tert-butoxystyrene) and poly(p-methoxystyrene), and $3.0 \times 10^4$ in Mn and 1.08 in Mw/Mn.

The Mn value agreed well with the value of $2.9 \times 10^4$ which was calculated assuming that one molecule of the adduct formed a four-branched molecule.

The copolymer was further treated with hydrogen bromide to convert the poly(p-tert-butoxystyrene) in the inside to poly(p-vinylphenol) and obtain an amphiphatic four -branched star copolymer having hydrophilic groups internally and hydrophobic groups externally.

What is claimed is:

1. A process for preparing a three-branched or four-branched star compound characterized by polymerizing an olefin compound represented by the formula

wherein A is a single bond or phenylene group, and $R^3$ is a hydrogen atom or methyl group and $R^4$ is a monovalent organic group when A is a single bond, or $R^3$ is a hydrogen atom and $R^4$ is an alkyl group when A is a phenylene group, using the adduct of a polyfunctional alkenyl ether represented by the formula

wherein $R^1$ is a hydrogen atom or methyl group, n is an integer of 3 or 4, and $R^2$ is a trivalent organic group when n is 3 or a tetravalent organic group when n is 4 with a cation-donating compound to prepare a three-branched or four-branched star compound represented by the formula

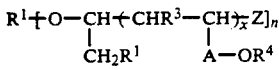 (III)

wherein x is 1 to 10,000, Z is a terminator residue, and $R^1$, $R^2$, $R^3$, $R^4$, A and n are as defined above.

2. A process as defined in claim 1 wherein an alkenyl ether represented by the formula

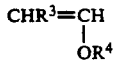 (IIa)

wherein $R^3$ is a hydrogen atom or methyl group, and $R^4$ is a monovalent organic group is polymerized using the adduct of a trifunctional alkenyl ether represented by the formula

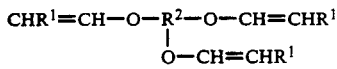 (Ia)

wherein $R^1$ is a hydrogen atom or methyl group, and $R^2$ is a trivalent organic group with a cation-donating compound to prepare a three-branched star alkenyl ether represented by the formula

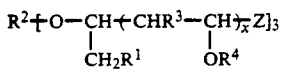 (IIIa)

wherein x is 1 to 10,000, Z is a terminator residue, and $R^1$, $R^2$, $R^3$ and $R^4$ are as defined above.

3. A process as defined in claim 1 wherein an alkyloxystyrene represented by the formula

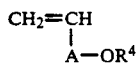 (IIb)

wherein A is a phenylene group, and $R^4$ is an alkyl group is polymerized using the adduct of a trifunctional alkenyl ether represented by the formula

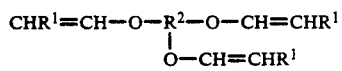 (Ia)

wherein $R^1$ is a hydrogen atom, and $R^2$ is a trivalent organic group with a cation-donating compound and a bivalent metal halide as an activating agent to prepare a three-branched star alkyloxystyrene represented by the formula

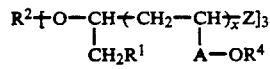 (IIIb)

wherein x is 1 to 10,000, Z is a terminator residue, and $R^1$, $R^2$, $R^4$ and A are as defined above.

4. A process as defined in claim 1 wherein an alkenyl ether represented by the formula

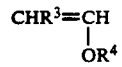 (IIa)

wherein $R^3$ is a hydrogen atom or methyl group, and $R^4$ is a monovalent organic group is polymerized using the adduct of a tetrafunctional alkenyl ether represented by the formula

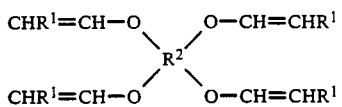 (Ib)

wherein $R^1$ is a hydrogen atom or methyl group, and $R^2$ is a tetravalent organic group with a cation-donating compound to prepare a four-branched star alkenyl ether represented by the formula

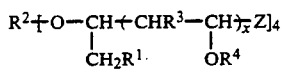 (IIIc)

wherein x is 1 to 10,000, Z is a terminator residue, and $R^1$, $R^2$, $R^3$ and $R^4$ are as defined above.

5. A process as defined in claim 1 wherein an alkyloxystyrene represented by the formula

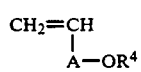 (IIb)

wherein A is a phenylene group, and $R^4$ is an alkyl group is polymerized using the adduct of a tetrafunctional alkenyl ether represented by the formula

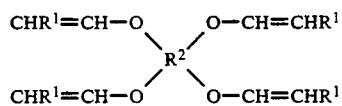 (Ib)

wherein $R^1$ is a hydrogen atom or methyl group, and $R^2$ is a tetravalent organic group with a cation-donating compound, and a bivalent metal halide as an activating agent to prepare a four-branched star alkyloxystyrene represented by the formula

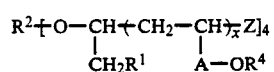 (IIId)

wherein x is 1 to 10,000, Z is a terminator residue, and $R^1$, $R^2$, $R^4$ and A are as defined above.

6. A process as defined in claim 2 or 4 wherein the polymerization is effected in the presence a Lewis acid.

7. A process as defined in claim 2 or 4 wherein the polymerization is effected in the presence of a Lewis acid and an organoaluminum compound.

8. A process as defined in any one of claims 1 to 5 wherein the adduct is a compound represented by the formula

 (IV)

wherein $R^1$, $R^2$ and n are as defined in claim 1, and B is the portion of the cation-donating compound remaining after the donation of cation.

9. A process as defined in any one of claims 1 to 5 wherein a plurality of different olefin compounds (I) are reacted successively to obtain a multi-branched star polymer in the form of a block copolymer.

10. A process as defined in any one of claims 1 to 5 wherein x is 4 to 5000.

* * * * *